United States Patent [19]
Kinoshita

[11] Patent Number: 5,260,977
[45] Date of Patent: Nov. 9, 1993

[54] COMMUNICATION TERMINAL EQUIPMENT

[75] Inventor: Haruki Kinoshita, Hachioji, Japan

[73] Assignee: Kabushiki Kaisha Toshiba, Kawasaki, Japan

[21] Appl. No.: 666,065

[22] Filed: Mar. 7, 1991

[30] Foreign Application Priority Data

Mar. 8, 1990 [JP] Japan ................................. 2-57340

[51] Int. Cl.⁵ .............................................. H04L 7/00
[52] U.S. Cl. .................... 375/106; 375/112; 375/122
[58] Field of Search ............. 375/106, 112, 113, 122, 375/8, 121, 107; 370/84, 102; 341/61

[56] References Cited
U.S. PATENT DOCUMENTS 4,484,327  11/1984  Hanson ................................. 370/84
4,860,283  8/1989  Takano et al. ....................... 370/84

Primary Examiner—Curtis Kuntz
Assistant Examiner—Tesfaldet Bocure
Attorney, Agent, or Firm—Finnegan, Henderson, Farabow, Garrett & Dunner

[57] ABSTRACT

A communication terminal equipment which allows data communication with a party terminal having a data communication rate different from that of the terminal equipment. Mask timing is set to periodically delete a synchronizing clock of the data communication rate of the communication terminal equipment on the basis of the data communication rate of the party terminal, a receive data is received from the party terminal in synchronism with the synchronizing clock and also the reception is made invalid at the mask timing, and a send data is transmitted to the party terminal in synchronism with the synchronizing clock also with the send data being added with a predetermined dummy bit at the mask timing.

9 Claims, 4 Drawing Sheets

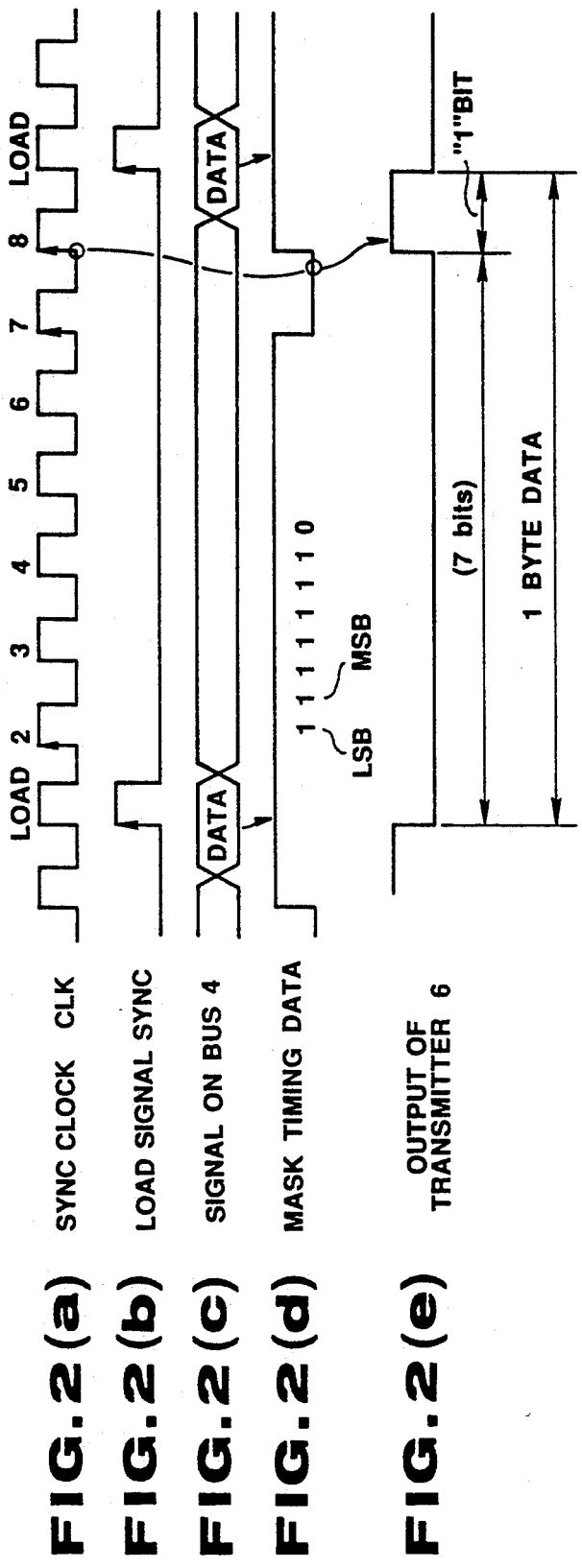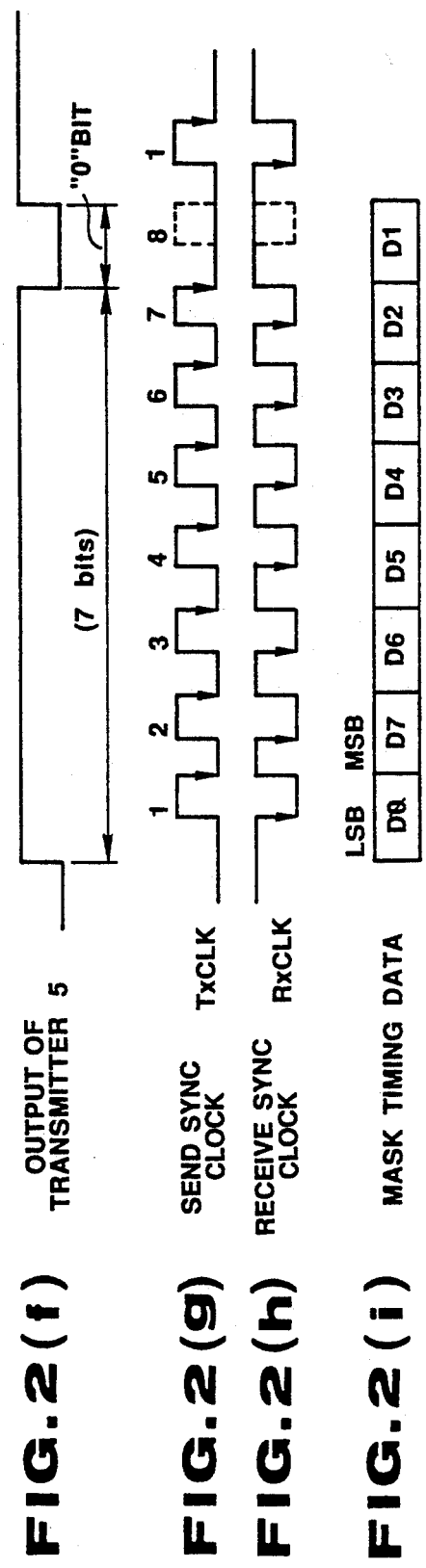

COMMUNICATION TERMINAL EQUIPMENT

BACKGROUND OF THE INVENTION

1. Field of the Invention

The present invention relates to communication terminal equipment which perform data communication with party terminals whose data communication rates are different from those of the caller terminal equipments and more particularly, to a communication terminal equipment of a simple structure, which allows data communication with any party terminal having a data communication rate different from that of the caller terminal equipment.

2. Description of the Related Art

Recently, integrated services digital network (ISDN) and the corresponding various sorts of data exchange networks connectable with the ISDN have become widely available, and various types of terminals have been used in these networks. Data communication has been increasingly carried out between these different types of terminals.

In the data communication between these different types of terminals, it sometimes occurs that the data communication rate of a terminal is different from that of another terminal. In such a case, matching of the data communication rate among terminals must be made by changing the data communication rate of at least one terminal.

Referring to FIG. 3, an ISDN 200 is connected with a terminal 101 having a data communication rate of 64 Kbps and also with another data exchange network 300 which in turn is connected with another terminal 102 having a data communication rate of 56 Kbps. Data communication between the terminals 101 and 102 can be established by means of interwork between the ISDN 200 and the data exchange network 300. The data communication is required to be carried out at the data communication rate of the terminal 101 of the ISDN 200 which is smaller than that of the other terminal, that is, at 56 Kbps.

For data communication between different types of two terminals, a matching circuit must be provided for matching of their data communication rates. In the case where a plurality of party terminals each have different data communication rates, different matching circuits must be provided depending on the data communication rates and be selectively used as necessary, thus involving a complicated circuit configuration and a high cost.

SUMMARY OF THE INVENTION

It is therefore an object of the present invention to provide communication terminal equipment which can realize suitable matching between a plurality of different data communication rates with a simple circuit configuration.

In accordance with an aspect of the present invention, there is provided a communication terminal equipment which allows data communication with a party terminal having a data communication rate different from that of the terminal equipment, and wherein mask timing is set to periodically delete a synchronizing clock of the data communication rate of the communication terminal equipment on the basis of the data communication rate of the party terminal, a receive data is received from the party terminal in synchronism with the synchronizing clock and also the reception is made invalid at the mask timing, and a send data is transmitted to the party terminal in synchronism with the synchronizing clock also with the send data being added with a predetermined dummy bit at the mask timing.

In the present invention, when the mask timing is set for periodically deleting the synchronizing clock, the receive data received in synchronism with the synchronizing clock is made invalid at the mask timing while a dummy bit is added to the send data to be transmitted in synchronism with the synchronizing clock at the mask timing. For this reason, the mask timing is set to be suitable for each of a plurality of different data communication rates, proper matching with each data communication rate can be realized.

According to the present invention, when the mask timing is set to be suitable for each of a plurality of different data communication rates, proper matching with each data communication rate can be realized. As a result, there can be provided a communication terminal equipment which can avoid a complicated circuit configuration and a high cost.

BRIEF DESCRIPTION OF THE DRAWINGS

FIGS. 2(a)-2(i) is a timing chart showing waveforms of signals appearing at various points in the embodiment of FIG. 1;

DESCRIPTION OF THE PREFERRED EMBODIMENTS

An embodiment of the present invention will be detailed with reference to the attached drawings.

Figure 1:
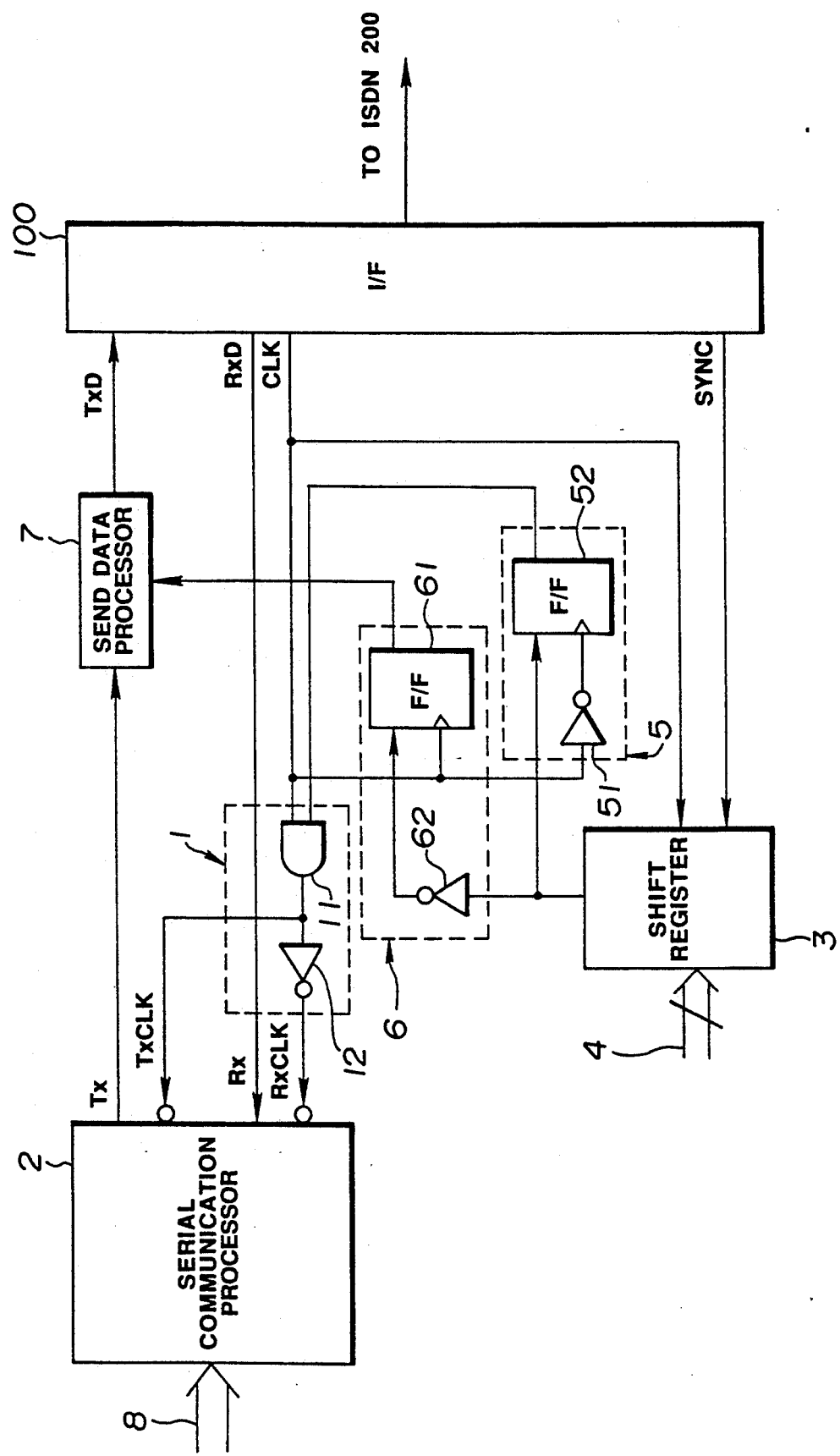
FIG. 1 is a block diagram of communication terminal equipment in accordance with an embodiment of the present invention.

Referring to FIG. 1, there is shown a block diagram of a communication terminal equipment in accordance with an embodiment of the present invention.

Figure 3:
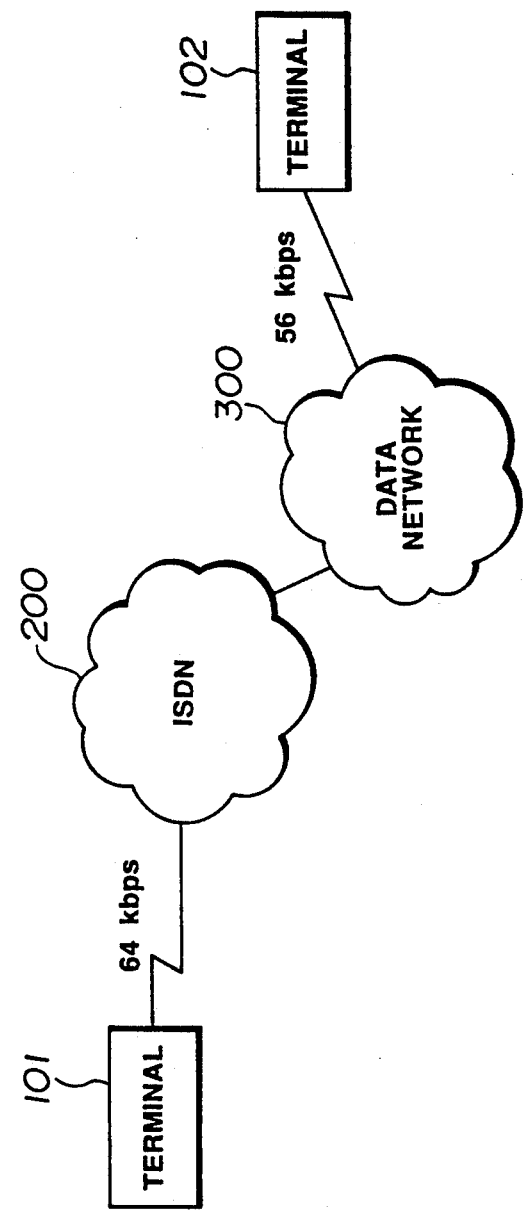
FIG. 3 shows a schematic example of two terminals having different data communication rates and communication networks connected between the two terminals.

In the drawing, a terminal interface circuit 100, which is connected to the ISDN 200 of FIG. 3, receives a signal at a data communication rate of 64 Kbps from the ISDN 200 and outputs a 64 Kbps reception data R×D and a synchronizing clock CLK together with a synchronizing signal SYNC synchronous with the clock CLK. The terminal interface circuit 100 also receives a transmission data T×D from its terminal side and sends it to the ISDN 200.

The synchronizing clock CLK issued from the terminal interface circuit 100 is received at a send/receive synchronizer 1 where a receive synchronizing clock R×CLK and a send synchronizing clock T×CLK are generated. The receive and send synchronizing clocks R×CLK and T×CLK are sent from the send/receive synchronizer 1 to a serial communication processor 2.

The processor 2 receives a data R× from the terminal interface circuit 100 in synchronization with the receive synchronizing clock R×CLK, and sends to a send data processor 7 a data T× (to be transmitted) received from a data bus 8 in synchronism with the send synchronizing clock T×CLK.

A shift register 3 receives parallel mask timing data from a system bus 4 in response to a reception of the synchronizing signal SYNC from the terminal interface circuit 100.

A first data transmitter 5 receives the synchronizing clock CLK from the terminal interface circuit 100 and the serial mask timing data from the shift register 3, and sends the mask timing data to the send/receive synchronizer 1 serially on a bit-by-bit basis in synchronism with the synchronizing clock CLK.

A second data transmitter 6 receives the synchronizing clock CLK from the terminal interface circuit 100 and the serial mask timing data from the shift register 3, and sends the mask timing data to the send data processor 7 serially on a bit-by-bit basis in synchronization with the synchronizing clock CLK.

FIG. 2 shows a timing chart of waveforms of signals at various points in the present communication terminal equipment. The exemplary operation of the equipment will be detailed by referring to this timing chart. Assume now that, as shown in FIG. 3, the present communication terminal equipment 101 having a data communication rate of 64 Kbps is connected to the ISDN 200 while the communication party terminal 102 having a data communication rate of 56 Kbps is connected to the data communication network 300.

In this case, through the interwork between the ISDN 200 and the other data communication network 300, a 64 Kbps data issued from the communication terminal equipment 101 is deleted by one bit for every 8 bits and converted into a 56 Kbps data which in turn is received at the party terminal 102.

A 56 Kbps data emitted from the party terminal 102, on the other hand, is added by one invalid for every 7 bits and converted into a 64 Kbps data through the interwork between the ISDN 200 and the other data communication network 300, and the converted 64 Kbps data is received at the communication terminal equipment 101.

First, in response to a rising edge in the synchronizing signal SYNC (shown by FIG. 2(b)) issued from the terminal interface circuit 100, a mask timing data (shown by FIG. 2(c)) on the system bus 4 is input to the shift register 3. The mask timing data has such a format as shown by FIG. 2(i), that is, has a value "1" for the first to seventh bits and has a value "0" for the last eighth bit as shown in FIG. 2(d).

In the first data transmitter 5, the synchronizing clock CLK of 64 Kbps from the terminal interface circuit 100 is received at a NOT circuit 51 and then sent to a flip-flop 52 so that the flip-flop 52 loads the mask timing data from the shift register 3 and sends it to the send/receive synchronizer 1 on a bit-by-bit basis in response to a falling edge in the synchronizing clock CLK. As a result, the mask timing data is input from a flip-flop 52 of the first data transmitter 5 to an AND circuit 11 of the send/receive transmitter 1 with a time lag of half a period (shown by FIG. 2(f)) of the synchronizing clock CLK with respect to the input timing of the mask timing data into the shift register 3.

The AND circuit 11 of the send/receive synchronizer 1 also receives the synchronizing clock CLK of 64 Kbps from the terminal interface circuit 100 to find a logical "OR" of the received clock CLK and the mask timing data received from the flip-flop 52 and outputs a send synchronizing clock T×CLK (shown by FIG. 2(g)) indicative of the found logical "OR". Since the mask timing data from the flip-flop 52 has a value "0" at the timing of the eighth bit of the synchronizing clock CLK as a result of the logical "OR", it means that the eighth bit of the send synchronizing clock T×CLK is deleted. The send synchronizing clock T×CLK is applied to the serial communication processor 2 and also to a NOT circuit 12.

The NOT circuit 12 inverts the send synchronizing clock T×CLK received from the AND circuit 11 of the send/receive synchronizer 1 to form a receive synchronizing clock R×CLK (shown by FIG. 2(h)) and sends the receive synchronizing clock R×CLK to the serial communication processor 2.

Since the serial communication processor 2 sequentially receives the receive data R×D of 64 Kbps from the terminal interface circuit 100 in synchronism with falling edges in the receive synchronizing clock R×CLK, the processor 2 substantially receives the data Rx corresponding to the first to seventh bits of the receive data R×D, with the eighth invalid bit being deleted.

Further, when the same mask timing data as in the previous case is input from the system bus 4 into the shift register 3 in response to the next rising edge in the synchronizing signal SYNC, the same receiving operation as the previous one is carried out so that the serial communication processor 2 receives the 64 Kbps receive data R×D from the terminal interface circuit 100 but with the eighth invalid bit being deleted. When the receive data R×D is subjected to the deletion of one bit for every 8 bits through such repetitive receiving operation, the effective 56 Kbps data Rx from the part terminal 102 can be extracted from the 64 Kbps receive data R×D obtained by adding one invalid bit for every 7 bits and converting into the 64 Kbps data through the interwork between the ISDN 200 and the other data exchange network 300.

In the second data transmitter 6, then, a flip-flop 61 receiving the 64 Kbps synchronizing clock CLK from the terminal interface circuit 100 sequentially loads the mask timing data from the shift register 3 through a NOT circuit 62 on a bit-by-bit basis in response to a rising edge in the synchronizing clock CLK, and sends an inversion of the loaded mask timing data to the send data processor 7. As a result, the inverted mask timing data is sent from the flip-flop 61 to the send data processor 7 with a delay of the synchronizing clock CLK by one period with respect to the input timing of the mask timing data into the shift register 3.

The serial communication processor 2 sequentially sends the data TX (to be transmitted) received from the data bus 8 to the send processor 7 in synchronism with falling edges in the send synchronizing clock T×CLK. The data Tx is sequentially sent to the send data processor 7 at the timing of falling edges in the first to seventh bits of the synchronizing clock CLK while the data Tx is not sent thereto at the timing of the falling edge of the eighth bit thereof.

Figure 4:
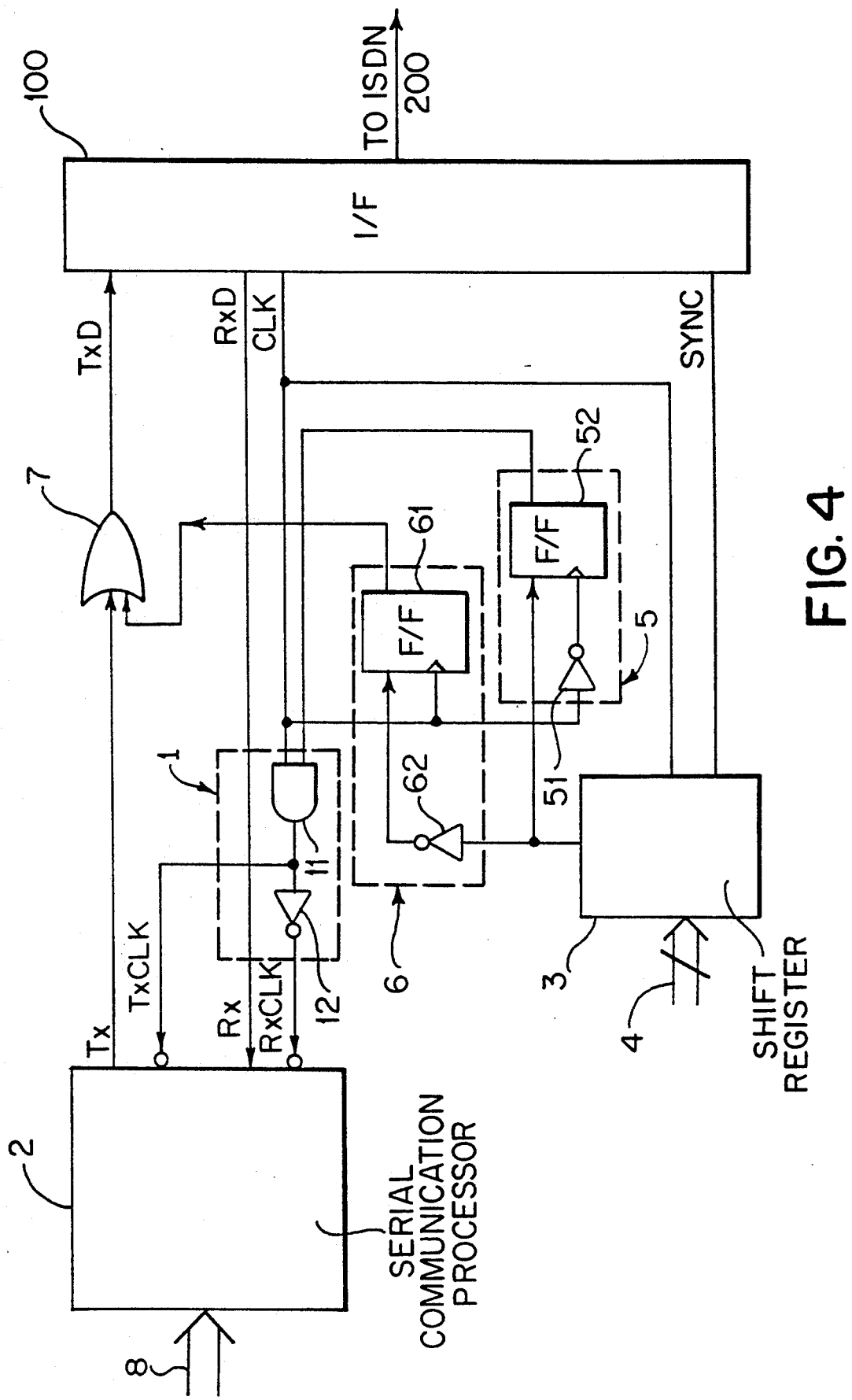
FIG. 4 is a block diagram showing one embodiment of the present invention, the embodiment including an OR gate.

The send data processor 7 sequentially receives the data Tx from the serial communication processor 2, sequentially adds a preset dummy bit to the received data at the rising timing of the inverted mask timing data received from the second data transmitter 6, that is, at the rising edge of the eighth bit of the synchronizing clock CLK, and the outputs it to the terminal interface circuit 100. That is, the send data processor 7 receives the data Tx from the serial communication processor 2, adds the dummy bit to the received data Tx at the timing of the eighth bit of the synchronizing clock CLK to form a send data T×D, and then sends the data T×D to the terminal interface circuit 100. In this connection, the dummy bit is previously set to exhibit a value of "0" or "1". In the embodiment shown in FIG. 4, when the dummy bit is set to have a value "1", the send data processor 7 comprises an OR gate which receives the data Tx from the serial communication processor 2 and the inverted mask timing data from the second data transmitter 6.

When one dummy bit is sequentially added through the repetition of the aforementioned transmitting operation, the send data T×D is transmitted as a 64 Kbps data from the communication terminal 101, subjected to deletion of one dummy bit for every 8 bits thereof through the interwork between the ISDN 200 and the other data exchange network 300 to be converted into a valid 56 Kbps data, and then received at the party terminal 102.

As discussed above, in the present embodiment, on the basis of the mask timing data having the first to seventh bits set to have all a value "1" and the eighth bit set to have a value "0", one bit is deleted for every 8 bits of the 64 Kbps receive data to extract the valid 56 kbps data from the 64 Kbps receive data, one dummy bit is added for every 7 bits of the valid 56 Kbps data to form a 64 Kbps send data to be transmitted, whereby the caller terminal can realize data communication with the party terminal having a data communication rate of 56 Kbps.

Similarly, when the first to sixth bits of the mask timing data are set to have all a value "1" and the seventh and eighth bits thereof are set to have both a value "0", 2 bits are deleted for every 8 bits of the receive data on the basis of the mask timing data to extract a 48 Kbps data from the 64 Kbps receive data, two dummy bits are added for every 6 bits of the 48 kbps data to form a 64 Kbps send data to be transmitted. In this case, the caller terminal can achieve data communication with the party terminal having a data communication rate of 48 Kbps.

Therefore, only by properly setting the mask timing data, communication with the party terminals having a plurality of different data communication rates can be realized and the need for switching exclusive circuits for matching with the respective party terminals can be eliminated.

What is claimed is:

1. Communication terminal equipment comprising:
    terminal interface means connected to a data exchange network of a first communication rate:
    clock generation means for receiving a received clock signal and a synchronizing signal comprising a clock pulse train synchronized with serial received data having the first communication rate output from the terminal interface means and generating a send clock signal and a receive clock signal corresponding, both the send clock signal and the receive clock signal to a second communication rate by periodically deleting a predetermined clock pulse from the received clock signal at a predetermined timing synchronized with the synchronizing signal;
    serial communication means for sampling and receiving the serial received data of the first communication rate output from the terminal interface means in synchronism with each clock pulse of the receive clock signal generated at the clock generation means and sending data received from a terminal as serial send data in synchronism with each clock pulse of the send clock signal generated at the clock generation means; and
    dummy bit addition means for adding a dummy bit at the timing of the deleted clock pulse of the send clock signal to the serial send data sent from the serial communication means and outputting the serial send data added with the dummy bit as the serial send data of the first communication rate to the terminal interface means.

2. Communication terminal equipment as set forth in claim 1, wherein the clock generation means includes mask pattern generation means for generating a mask pattern signal used for periodically deleting the clock pulse of the clock signal output from the terminal interface means at a predetermined timing in synchronism with the received clock signal and the synchronizing signal output from the terminal interface means and mask means for masking the clock signal received from the terminal interface means in accordance with the mask pattern signal generated at the mask pattern generation means and periodically deleting the predetermined clock pulse from the received clock signal at the predetermined timing synchronized with the synchronizing signal.

3. Communication terminal equipment as set forth in claim 2, wherein the mask pattern generation means includes memory means for storing data of a plurality of bits corresponding to the mask pattern and means for sequentially reading out the plural-bit data from the memory means in synchronism with the received clock signal and the synchronizing signal received from the terminal interface means.

4. Communication terminal equipment as set forth in claim 3, wherein the plural-bit data stored in the memory means have a value "0" for a bit corresponding to the timing of the deleted clock pulse and have a value "1" for remaining bits.

5. Communication terminal equipment as set forth in claim 2, wherein the mask means comprises a gate circuit for gating the received clock signal received from the terminal interface means in accordance with the mask pattern signal generated at the mask pattern generation means.

6. Communication terminal equipment as set forth in claim 1, wherein the clock generation means includes mask pattern generation means for generating a mask pattern signal in synchronism with the received clock signal and the synchronizing signal received from the terminal interface means, send-clock generation means for periodically deleting a predetermined clock pulse of the clock signal received from the terminal interface means in accordance with the mask pattern signal generated at the mask pattern and receive-clock generation means for generating the receive clock signal by inverting the send clock signal received from the send-clock generation means.

7. Communication terminal equipment as set forth in claim 1, wherein the dummy bit addition means includes dummy-bit-addition timing signal generation means for generating a dummy-bit-addition timing signal at the timing of the deleted clock pulse of the send clock signal and addition means for adding a dummy bit to the serial send data sent from the serial communication means in synchronism with the dummy bit addition timing signal issued from the dummy-bit-addition timing signal generation means.

8. Communication terminal equipment as set forth in claim 7, wherein the dummy-bit-addition timing signal generation means generates a signal "1" at the timing of the deleted clock pulse of the send clock signal and the addition means comprises an OR gate for receiving the serial send data sent from the serial communication means and an output of the dummy-bit-addition timing signal generation means.

9. A communication terminal equipment comprising:

mask pattern data generation means for generating a mask pattern data corresponding to a data communication rate of a party terminal and having a value "0" for a predetermined bit and a value "1" for remaining bits;

a shift register for storing the mask pattern data generated at the mask pattern data generation means in synchronism with a synchronizing signal received from a data exchange network and sequentially outputting the mask pattern data on bit-by-bit basis in synchronism with a clock signal received from the data exchange network;

first data transmission means for sequentially latching and outputting an output of the shift register at the falling timing of the clock signal received from the data exchange network;

second data transmission means for sequentially latching and outputting an inversion signal corresponding to an inversion of the output of the shift register at the rising timing of the clock signal received from the data exchange network;

send/receive synchronization means including an AND gate for receiving an output of the first data transmission means and the clock signal from the data exchange network and outputting a send clock signal and also including a NOT circuit for inverting an output of the AND gate and outputting a receive clock signal;

serial communication means for receiving a serial receive data from the data exchange network in synchronism with the receive clock signal received from the send/receive synchronization means and for sending a data to be sent to the data exchange network as a serial send data in synchronism with the send clock signal received from the send/receive synchronization means; and send data processor means for adding a dummy bit to the serial send data received from the serial communication means on the basis of an output of the second data transmission means.

* * * * *